United States Patent Office

Re. 26,130
Reissued Dec. 27, 1966

26,130

SOLUTION AND METHOD FOR BRIGHTENING CADMIUM

Kenneth P. Bellinger, Ellington, and Eugene G. Chapdelaine, Hazardville, Conn., assignors to Conversion Chemical Corporation, Rockville, Conn., a corporation of Connecticut No Drawing. Original No. 3,072,516, dated Jan. 8, 1963, Ser. No. 97,164, Mar. 21, 1961. Application for reissue Jan. 9, 1964, Ser. No. 348,311
7 Claims. (Cl. 156—20)

Matter enclosed in heavy brackets [ ] appears in the original patent but forms no part of this reissue specification; matter printed in italics indicates the additions made by reissue.

The present invention relates to a novel solution and method for the chemical brightening of cadmium surfaces.

The term "cadmium surfaces" as used herein refers to the surfaces of cadmium and cadmium base alloy articles and other metallic articles having a coating of cadmium such as produced by electroplating.

It is an aim of the present invention to provide a method for the brightening of cadmium surfaces which is rapid and relatively non-critical so as to enable greater uniformity of operation and appearance.

It is also an aim of the present invention to provide a method for brightening cadmium surfaces by a simple and inexpensive one-step treatment which further provides mild corrosion and tarnish protection for the cadmium surface.

Another aim is to provide a method for brightening cadmium surfaces wherein the rinsing of the workpiece subsequent to the action of the brightening bath is relatively non-critical so as to provide attractive, uniformly brightened workpieces with minimal rejection.

A further aim is to provide an easily transported and handled dry powder composition for addition to an aqueous acid bath in relatively small amounts for the production of a dilute cadmium brightening solution to attain the foregoing aims.

Other advantages will be readily apparent from the following detailed specification and claims.

It has now been found that the foregoing and related aims can be obtained by a method in which the cadmium workpieces are immersed in an acid bath consisting essentially of dilute aqueous solution of trivalent chromium ions, nitrate ions, [and ions selected from the group consisting of fluoride, sulfate, and combinations thereof] *and the combination of fluoride and sulfate ions.* The pH of the bath should be maintained between about 1.0–3.5, and preferably in the range of 1.5–2.0 for short dips of up to 10 seconds, and in the range of 1.8–3.5 for dips up to one minute or longer.

Hexavalent chromium ions have been found to produce a dulling effect upon the cadmium surfaces so that the presence of hexavalent chromium is to be avoided. In baths having a pH of about 1.0–2.0, a concentration of as little as 0.02 gram per liter of hexavalent chromium constitutes the upper limit of tolerance, and a dulling surface effect is noticeable. With baths of higher pH on the order of 2.0–3.5, a greater concentration of hexavalent chromium can be tolerated, although the amount is still relatively small and less than 0.3 gram per liter. The bath itself is non-oxidizing with respect to the trivalent chromium so that only impurities in the components or impurities carried into the bath upon the workpieces need be considered. The baths of the present invention are thus essentially characterized as substantially free from hexavalent chromium ions.

Generally, the bath should contain trivalent chromium ions in the range of 0.08–1.0 gram per liter, nitrate ions in the range of about 0.1–18.0 grams per liter, [and ions selected from the group consisting of fluoride, sulfate,] and the combination [thereof,] *of fluoride and sulfate ions* in the range of 0.4–5.2 grams per liter.

The [preferred] solutions in accordance with the present invention contain both sulfate and fluoride ions since solutions containing both ions have been found to provide the cadmium surface with an appreciable degree of protection to corrosion by fume and moisture. Generally, the fluoride ion concentration in such solutions should be about one-third that of the sulfate ion and be in the range of about 0.1–1.2 grams per liter, and the sulfate ion concentration about 0.25–4.0 grams per liter.

The initial presence of zinc and/or cadmium ions in the bath has also been found desirable in controlling the action of the bath upon the cadmium surface and in providing uniform brightness. These metallic ions are preferably added as the sulfate salt so as to provide the desired pH by the nitric acid and limit the introduction of any unessential ions. Generally, when such ions are to be incorporated, they should be presented in the amount of about 0.1–3.0 grams per liter.

The bath of the present invention is preferably utilized at ambient temperatures on the order of 60–90° F. for optimum operation. However, elevated temperatures of 45–150° F. may be employed depending upon the concentration of the bath and the time of treatment. Generally, the more dilute the bath, the higher the temperature that may be employed so as to provide a satisfactory treatment time and brightening action.

The time of treatment will vary with the temperature, pH and concentration of the bath. Generally, the period of immersion will vary between about 2 seconds and 10 minutes depending upon these three factors. The optimum time of treatment for a given bath concentration, temperature and pH is best determined by visual observation of a specimen workpiece. Generally, the preferred baths of the present invention operated at ambient temperatures require an immersion period of only about 5–45 seconds.

Subsequent to immersion in the bath of the present invention, the cadmium workpieces are rinsed in cold water and then rinsed in hot water for drying.

The preferred baths of the present invention are those containing about 0.2–0.3 gram per liter of trivalent chromium ions, 3.75–5.0 grams per liter of nitrate ions, 0.2–0.4 gram per liter of fluoride ions and 0.75–1.5 grams per liter of sulfate ions, the bath having a pH of about 1.5–2.0 and being substantially free from hexavalent chromium ions. Additionally, 0.5–1.0 gram per liter of zinc or cadmium ions is desirable for control and optimum brightening action during initial use. Such a bath composition produces a highly desirable luster and mild protection upon the cadmium surface at ambient temperatures in 5–45 seconds immersion.

Generally, the bath is prepared by addition to water of nitric acid and suitable salts of the various other ions. As can readily be appreciated, the introduction of unnecessary ions is desirably avoided since interference may be provided thereby. Thus, it has been found that the use of a dry powder composition containing chromium fluoride, sodium acid fluoride, and zinc or cadmium sulfate has been economical for the consumer while providing highly desirable results and enabling easy shipment. Complex fluoride salts can also be employed such as the fluoroborates and fluosilicates.

A specific dry powder composition which is readily transported and utilized for the production of cadmium brightening baths of the present invention is one containing the following salts in the indicated proportions:

| | Percent by weight |
|---|---|
| Sodium acid fluoride | 6–8 |
| Chromium fluoride | 20–22 |
| Zinc or cadmium sulfate | 70–72 |
| Total product | 100 |

This composition is then best utilized by an admixture of 1–4 pounds of the above, 100 gallons of water and 0.1–4.0 quarts of 42° Baumé nitric acid, and preferably 1.0–3.0 quarts of nitric acid for a bath requiring a relatively short immersion time of about 5 to 15 seconds.

Because of the acidity and corrosive nature of the baths of the present invention, suitable tanks should be employed to avoid contamination such as rigid polyvinyl chloride, steel lined with polyvinyl chloride or resin-bonded glass fibers or polyethylene.

From time to time, the bath will have to be replenished by the addition of the several components as the concentration is reduced by carry-out and reaction. This can generally be determined by visual observation of lesser brightening of the workpieces. Generally, addition of one-half the original make-up amounts is conveniently employed when such visual reduction is observed. Analytically, the bath can be titrated with 1 N sodium hydroxide using phenolphthalein as an indicator. For example, when using the formulation set forth with respect to the dry powder composition, the following test is conveniently employed. For a 100 cc. sample, 10 cc. sodium hydroxide is required for optimum bath concentration. For every cubic centimeter of sodium hydroxide less than 10 cc., 3¼ ounces of the dry powder composition and 6½ fluid ounces of 42° Baumé nitric acid are added per 100 gallons of bath. Of course, the pH should be maintained within the described limits during operation.

Indicative of the efficacy of the present invention are the following specific examples wherein cadmium-plated workpieces were treated.

EXAMPLE 1

A cadmium brightening bath was prepared by adding to water 42° Baumé nitric acid and a dry powder mix containing 7.12 percent by weight sodium acid fluoride, 21.25 percent by weight chromium fluoride, and 71.63 percent by weight zinc sulfate. The nitric acid and dry powder mix were added in a ratio of two quarts and two pounds, respectively, per 100 gallons of water. The resulting bath had a pH of about 1.8 and was maintained at a temperature of about 75° F.

Test panels of steel plated with cadmium to a thickness of about 0.0002 inch and measuring 1½ inches by 1¼ inches were immersed in the bath for ten seconds, rinsed in cold water for three seconds, rinsed in hot water (180° F.) for three seconds and air dried. The treated panels were observed to have a lustrous finish of uniform brightness and were observed to be much brighter than an untreated control panel specimen.

To measure the protection afforded by the treatment, specimens were subjected to a humidity test in which they were exposed to 100 percent humidity at a temperature of 100° F. for forty-eight hours. At the end of this exposure, there was no evidence of "spotting out" or formation of dark blemishes, which is indicative of the mild protection afforded by the treatment of the present invention.

EXAMPLE 2

A bath was prepared in accordance with Example 1 and maintained at a temperature of about 80° F. Test specimens similar to those employed in Example 1 were immersed in the bath for about eight seconds, rinsed in cold water, rinsed in hot water and air dried. The resultant panels had a uniform luster much brighter than an untreated control panel.

One of the tests utilized in the industry to evaluate protection is that of placing a drop of 1.0 percent by weight lead acetate solution on the treated part and determining the time in which the spot turns black. An untreated specimen will turn black immediately. When the treated panels were tested, the spot turned grey in about five to ten seconds and continued darkening until completely black at the end of about fifty to sixty seconds. The treatment is thus seen to have provided mild protection for the cadmium surface in addition to high brightness.

We claim:

1. An acid bath for the brightening of cadmium surfaces comprising a dilute aqueous solution containing essentially 0.08–1.0 gram per liter of trivalent chromium ions, 0.1–18.0 grams per liter of nitrate ions and 0.4–5.2 grams per liter of *the combination of fluoride and sulfate* ions [selected from the group consisting of fluoride, sulfate and the combination thereof], said solution having a pH of about 1.0–3.5 and containing *at least 0.1 gram per liter of fluoride ion and 0.25 gram per liter of sulfate ion, said solution containing* less than about 0.3 gram per liter of hexavalent chromium ions.

2. The bath in accordance with claim 1 containing 0.25–4.0 grams per liter of sulfate ion and 0.1–1.2 grams per liter of fluoride ion, with the fluoride ion being about one-third the concentration of the sulfate ion.

3. An acid bath for the brightening of cadmium surfaces and providing a mild protection therefor comprising a dilute aqueous solution containing essentially 0.2–0.3 gram per liter of trivalent chromium ions, 3.75–5.0 grams per liter of nitrate ions, 0.2–0.4 gram per liter of fluoride ions, 0.75–1.5 grams per liter of sulfate ions and 0.5–1.0 gram per liter of ions selected from the group consisting of zinc, cadmium and the combination thereof, said solution having a pH of about 1.5–2.0 and containing less than about 0.02 gram per liter of hexavalent chromium ions.

4. As a dry powder additive for dilute solutions of nitric acid to provide an acid bath for the brightening of cadmium surfaces, a mixture containing essentially about 6–8 percent by weight of sodium acid fluoride, 20–22 percent by weight chromium fluoride, and 70–72 percent by weight of the sulfate salt of a metal selected from the group consisting of zinc and cadmium.

5. The method of brightening cadmium surfaces comprising providing a dilute aqueous containing essentially 0.08–1.0 gram per liter of trivalent chromium ions, 0.1–18.0 grams per liter of nitrate [ions and 0.4–5.2 grams per liter of ions selected from the group consisting of fluoride, sulfate,] and the combination [thereof] *of fluoride and sulfate ions,* said solution having a pH of about 1.0–3.5 and containing *at least 0.1 gram per liter of fluoride ion and 0.25 gram per liter of sulfate ion, said solution containing* less than about 0.3 gram per liter of hexavalent chromium ions; maintaining said solution at a temperature of about 45–150° F.; immersing a cadmium workpiece in said solution for a period of time sufficient to brighten the surface thereof; and rinsing said workpiece in cold water.

6. The method of brightening cadmium surfaces comprising providing a dilute aqueous solution containing essentially 0.2–0.3 gram per liter of trivalent chromium ions, 3.75–5.0 grams per liter of nitrate ions, 0.1–0.4 gram per liter of fluoride ions, 0.75–1.5 grams per liter of sulfate ions and 0.5–1.0 gram per liter of ions selected from the group consisting zinc, cadmium, and the combination thereof, said solution having a pH of about 1.5–2.0 and containing less than about 0.02 gram per liter of hexavalent chromium ions; maintaining said solution at ambient temperature; immersing a cadmium workpiece in said solution for a period of about 5–45 seconds sufficient to brighten the surface thereof; and rinsing said workpiece in cold water.

*7. The method of claim 5 wherein said bath contains 0.25–4.0 grams per liter of sulfate ion and 0.1–1.2 grams per liter of fluoride ion.*

References Cited by the Examiner

The following references, cited by the Examiner, are of record in the patented file of this patent or the original patent.

UNITED STATES PATENTS

| | | | |
|---|---|---|---|
| 2,035,380 | 3/1936 | Wilhelm | 148–6.2 |
| 2,194,498 | 3/1940 | Dupernell et al. | |
| 2,559,878 | 7/1951 | Johnson | 148—6.21 |
| 2,593,447 | 4/1952 | Hesch | 156—21 |
| 2,904,413 | 9/1959 | Hampel. | |
| 2,904,414 | 9/1959 | Ostrander et al. | |
| 2,955,027 | 10/1960 | Newell et al. | |
| 3,072,516 | 1/1963 | Bellinger et al. | 156—20 |

FOREIGN PATENTS

| | | |
|---|---|---|
| 481,183 | 2/1952 | Canada. |

ALEXANDER WYMAN, *Primary Examiner.*

JACOB H. STEINBERG, *Examiner.*